United States Patent [19]
Petersen et al.

[11] 3,872,335
[45] Mar. 18, 1975

[54] ROTATING RECTIFIER ASSEMBLY FOR BRUSHLESS EXCITERS

[75] Inventors: Sigrud R. Petersen, Irwin; Sui-Chun Ying, Monroeville; August C. Mann, Pittsburgh, all of Pa.

[73] Assignee: Westinghouse Electric Corporation, Pittsburgh, Pa.

[22] Filed: Mar. 7, 1974

[21] Appl. No.: 448,859

[52] U.S. Cl. ............................. 310/68 D, 310/72
[51] Int. Cl. ........................................ H02r 11/00
[58] Field of Search ............... 310/68, 68 D, 72, 71

[56] References Cited
UNITED STATES PATENTS
3,686,523   8/1972   Gorden et al. .................. 310/72
3,723,794   3/1973   Spisak et al. .................. 310/72 X Primary Examiner—J. D. Miller
Assistant Examiner—Robert J. Hickey
Attorney, Agent, or Firm—G. H. Telfer

[57] ABSTRACT

Brushless excitation systems for alternating current generators include an alternating current exciter and a rotating rectifier assembly. In such a system, the rectifier diodes of the rectifier assembly are mounted on the rim of a wheel which rotates with the exciter armature member, and the leads from the exciter winding extend along the shaft and through openings in the wheel for connection to the diodes. Supporting means are provided for the leads consisting of an elastic tubular member such as an aluminum sleeve, which extends axially from the wheel and encloses the leads. The leads are supported radially against the inner surface of the tubular member which has sufficient elasticity to permit limited radial deflection of the leads to follow the wheel when it expands radially in operation.

9 Claims, 4 Drawing Figures

ROTATING RECTIFIER ASSEMBLY FOR BRUSHLESS EXCITERS

BACKGROUND OF THE INVENTION

The present invention relates to brushless excitation systems for alternating current generators, and more particularly to improved supporting means for the electrical leads in the rotating rectifier assembly of such a system.

Brushless excitation systems are now widely used for supplying direct current field excitation to large alternating current generators. Such an excitation system includes an alternating current exciter having a stationary field structure and a rotating armature member. A rotating rectifier assembly is carried on a common shaft with the exciter armature and is connected thereto to provide a direct current output. The output of the rectifier is supplied to the field winding of the main generator which also rotates with the exciter armature and rectifier. In this way, an excitation system is provided which requires no commutator or slip rings and no sliding contacts.

The present invention relates to the rotating rectifier assembly of such excitation systems and, while its usefulness is not necessarily so limited, it is especially suitable for rectifier assemblies of the type disclosed and claimed in a copending application of T. L. Dillman and A. J. Spisak, Ser. No. 287,923, filed Sept. 11, 1972 and assigned to the Asignee of the present invention. In a rectifier assembly of this type, a plurality of rectifier modules are mounted on an axially extending rim of a rectifier wheel which is carried on the shaft of the alternating current exciter for rotation therewith. The leads from the rotating armature winding of the exciter extend along the shaft and pass through openings in the radial portion of the wheel. The leads are evenly distributed about the shaft and run longitudinally and substantially parallel to the shaft for a suitable distance after passing through the wheel and then extend radially for connection to the rectifier modules.

In the prior construction, the longitudinal portions of the leads were supported against rotational forces by wedging them in slots in a support ring mounted on the shaft, so that the leads were rigidly secured to the shaft. During operation, the rim of the rectifier wheel expands radially with respect to the shaft, and the connection means or terminals of the rectifier modules move radially with the wheel. Severe bending of the leads occurs when this happens because the longitudinal part of the lead is rigidly fixed in position and the short curved section of the lead beyond the wedged portion must bend to accommodate the radial deflection. Even if the lead is laminated for flexibility, this portion of the lead can, therefore, be dangerously overstressed. As the necessary capacities of these excitation systems increase, and the size of the rectifier wheels becomes larger to accommodate the necessary number of diodes, the centrifugal forces become greater and cause greater radial expansion of the wheel in operation. The problem of supporting the leads adequately against the rotational forces while at the same time permitting sufficient radial deflection to accommodate the radial expansion thus becomes more difficult.

SUMMARY OF THE INVENTION

In accordance with the present invention, improved means are provided for adequately supporting the leads in a rotating rectifier assembly of the type discussed above, while permitting sufficient radial deflection of the leads to allow them to follow the radial expansion of the diode wheel. For this purpose an elastic tubular member, preferably an aluminum tube or sleeve, is provided which is attached to the diode wheel and positioned to encircle the openings through which the leads pass, and which extends axially over the leads for at least a substantial part of the longitudinal portions of the leads. The leads engage the inner surface of the tube, preferably being disposed in longitudinal slots, so that they are adequately supported against radial forces. The tube has sufficient elasticity, however, to permit limited radial movement or deflection of the outer end, that is, the end remote from the wheel. The portions of the leads that are connected to the diodes are thus permitted to deflect sufficiently to accommodate the radial movement, and are not forced to bend sharply as in the prior construction. The tube preferably also has finger portions at its other end extending through the openings in the wheel and engaging the leads as they pass through the openings to support them at these locations. In this way, the leads are well supported against rotational forces but are permitted to move radially to the extent necessary to accommodate the radial expansion of the wheel without overstressing any part of the leads.

BRIEF DESCRIPTION OF THE DRAWING

The invention will be more fully understood from the following detailed description, taken in connection with the accompanying drawing, in which.

DESCRIPTION OF THE PREFERRED EMBODIMENT

Figure 1:
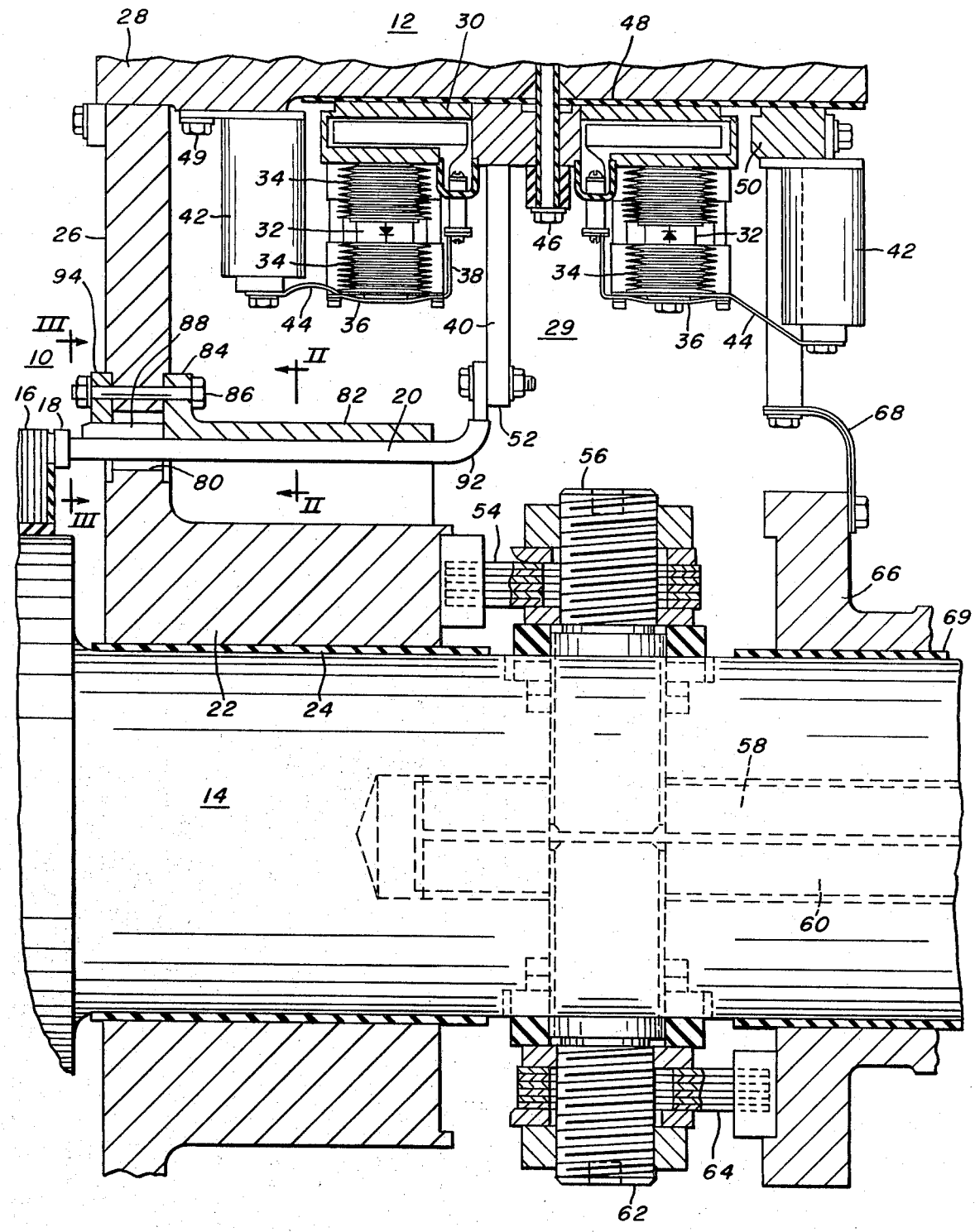
FIG. 1 is a longitudinal sectional view of a rotating rectifier assembly with a portion of its associated exciter.
Figure 2:
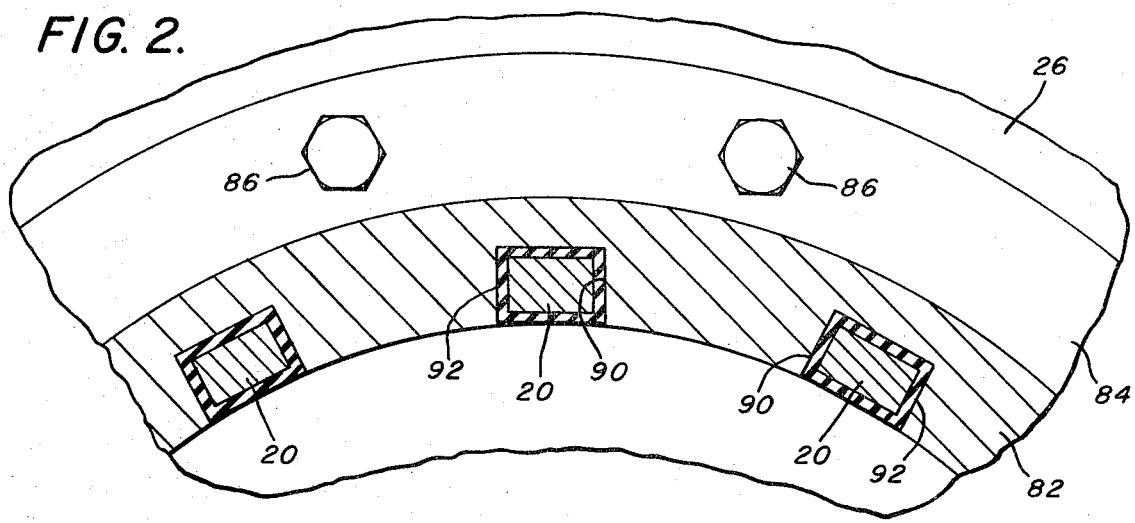
FIG. 2 is a fragmentary transverse sectional view substantially on the line II—II of FIG. 1.
Figure 3:
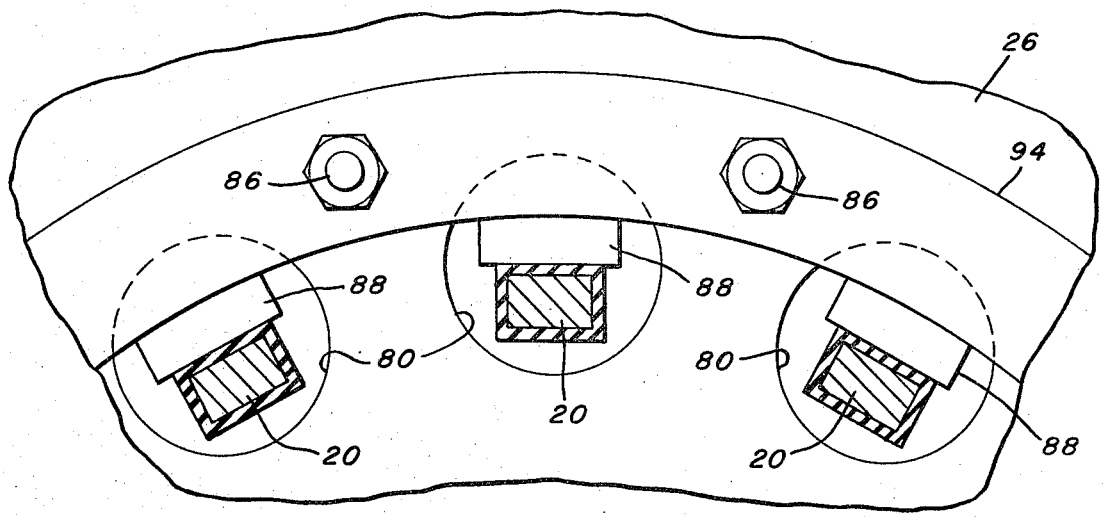
FIG. 3 is a fragmentary transverse view substantially on the line III—III of FIG. 1.

The invention is shown in the drawing embodied in a brushless excitation system which includes an alternating current exciter 10 and a rotating rectifier assembly 12 mounted on a common shaft 14 for rotation together. The alternating current exciter 10 may be of any suitable type having a stationary field structure (not shown) and a rotating armature member. As shown, the exciter armature member has a laminated core 16 mounted on the shaft 14 and carrying an armature winding 18 which is preferably a three-phase winding but which may be of any suitable or desired type. Axially extending leads 20 extend from the winding 18 for connection to the rectifier assembly and may be secured in place on the armature in any desired manner, as by banding with glass tape.

The rectifier assembly 12 includes a rectifier support wheel having a hub 22 which engages the shaft 14 and is insulated from it by a layer of insulating material 24. The wheel has a radial web portion 26, which may be integral with the hub 22, and has a longitudinally extending rim 28 which is generally cylindrical and extends from the outer periphery of the web portion 26.

The rectifier diodes themselves are mounted on the inner cylindrical surface of the rim 28 so as to be supported by the rim against the high centrifugal forces which occur during operation. The diodes mounted on the rim 28 are shown as being assembled in rectifier modules 29 of the type fully disclosed in the above-mentioned copending application, although any suitable arrangement of diodes can be utilized. As shown in FIG. 1, each module 29 consists of a conducting base 30 with two diode assemblies mounted thereon. Each of the diode assemblies consists of a diode 32 of the disc type supported between two heat sinks 34 and held in contact with the heat sinks and the base 30 by spring means indicated at 36. If desired, capacitors may be mounted in recesses in the base 30 and connected across the diode assemblies by means of terminals and connectors 38. As indicated in FIG. 1, the two diodes 32 are placed on the base 30 so as to be of opposite polarity with respect to the base, and a radial connector 40 extends from the base for making connection to the diode assemblies. A considerable number of rectifier modules 29 is usually required, and the necessary number of modules is evenly distributed around the rim 28, each module being mounted as described.

Fuses 42 are disposed on each side of each module 29 and connected to the diode assembly by conductors 44. The modules 29 are mounted on the inner surface of the rim 28 and secured thereto by an insulated bolt 46, a layer of insulation 48 being provided to insulate the base 30 from the wheel. The fuse 42 at the inner side of the module is directly connected to the rim 28 as by bolts 49, while the fuse 42 at the outer side of the module is insulated from the rim 28 by the insulation 48. The fuse at this side of the wheel are preferably connected together in groups by mounting them on conducting segments 50 secured to the rim.

The leads 20 from the exciter 10 are connected at 52 to the connectors 40 of the modules 29. The circuit then extends through the base 30 of each module, diode 32 and inner fuse 42 to the wheel rim 28. From the rim the circuit passes through the web portion 26 and a heavy laminated connector 54 to a radial insulated stud 56 which extends through a radial opening in the shaft 14 and is threaded into an insulated axial lead 58 extending through the shaft bore for connection to the generator field winding. The return circuit extends through a similar insulated lead 60 in the bore of the shaft to a second radial stud 62 and through a connector 64 to a ring 66 mounted on the shaft and insulated therefrom. The ring 66 is connected by connectors 68 to the segments 50, and the circuit is completed through the fuses 42 and outer diode assemblies back to the base 30.

Figure 4:
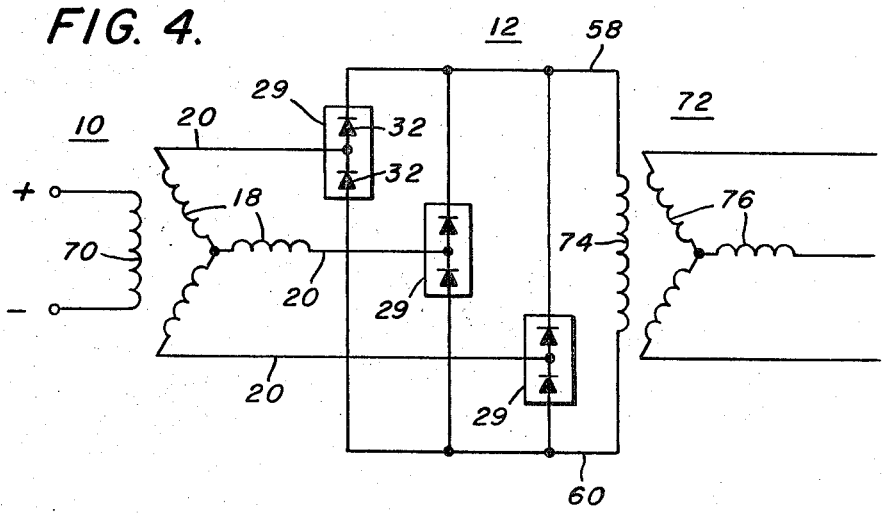
FIG. 4 is a simplified diagram of a brushless excitation system.

The electrical circuit of the brushless excitation system thus provided is shown in simplified form in FIG. 4. As there shown the system includes the alternating current exciter 10 which has a direct current field winding 70 carried on a stationary field structure to provide the field for the three-phase rotating armature winding 18. The leads 20 extend from the winding 18 to the rectifier assembly 12 which provides direct current excitation to the main generator 72. The rectifier assembly 12 consists of the necessary number of modules 29 mounted in the manner described above and connected to the leads 20. As previously described, each of the modules consists of two diodes 32 which are oppositely poled with respect to the lead 20, and which are connected to the respective output leads 58 and 60. The leads 58 and 60 are connected to supply direct current excitation to the field winding 74 of the generator 72, which has a stator winding 76 and may be of any suitable type. It will be understood, of course, that although only one module 29 is shown in each phase of FIG. 4 for the purpose of illustration, in an actual system a substantial number of modules will be utilized in parallel in each phase. The armature winding 18 of the exciter 10 may be of any desired configuration having any suitable number of branches per phase which may be connected either individually or in paralleled groups by the necessary number of leads 20 which extend along the shaft for connection to corresponding rectifier modules 29.

A relatively large number of leads 20 is thus required and these leads are distributed about the circumference of the shaft 14 are preferably evenly spaced from each other. The leads 20 extend substantially parallel to each other and to the shaft 14 from the winding 18 to the wheel 12. The leads then pass through openings 80 in the web portion 26 of the wheel and extend longitudinally to the position of the connectors 40. The leads then extend outwardly for connection to the respective connectors as indicated at 52. In normal operation, the rectifier wheel 12 rotates at high speed, such as 3600 revolutions per minute, so that high centrifugal forces occur and the rim 28 tends to expand radially, carrying the connectors 40 radially with its. In prior constructions, the longitudinal portions of the leads 20 were supported in a manner which essentially radialy attached them to the shaft. The end portions of the leads, therefore, were bent and dangerously overstressed when the connectors 40 moved radially outward carrying with them the ends of the leads to which they were connected.

In accordance with the present invention, the leads 20 are supported against rotational forces in such a manner that some radial deflection of the outer ends of the leads is permitted, so that they can move sufficiently to follow the radial movement of the connectors 40 without being sharply bent or overstressed. For this purpose, an elastic tubular support member 82 is provided. The support member 82 may be made of any non-magnetic material having the desired elastic properties, although aluminum has been found to be a desirable material. The support 82, therefore, is preferably an aluminum sleeve or tube and has a flange 84 by which it is attached to the web 26 of the rectifier wheel as by bolts 86. The tubular support member 82 is made of the proper internal diameter to enclose the leads 20, and is attached coaxially to the wheel web 26 in encircling relation with the openings 80 and the leads 20 which extend through them. The member 82 is made of sufficient length to extend over the longitudinal portions of the leads 20, as shown in the drawing, so as to adequately support the leads. The outer or right-hand end of the member 82, however, is free so that it can expand, or deflect radially, when necessary.

At the other end of the member 82, beyond the flange 84, the support member 82 is cut into a number of axial fingers 88 corresponding in number and position to the openings 80. The fingers 88 extend through the openings 80 in engagement with the conductors 20 to support them where they pass through the openings which are of relatively large size. Slots 90 are preferably cut in the inner surface of the member 82 in alignment with the fingers 88 and the conductors 20 are disposed in these slots to be adequately supported and properly held in place. The conductors are, of course, insulated as indicated at 92 on the portions which pass through the wheel web 26 and the support member 82. An annular end plate 94 is preferably attached to the wheel web 26 on the opposite side from the flange 84 to hold the outer ends of the fingers 88 rigidly in position. As shown, the plate 94 is an annular member having an internal diameter such that it extends over the openings 80 and directly engages the extremities of the fingers 88 so as to rigidly support them and prevent any movement or deflection of the conductors 20 on that side of the rectifier wheel. The end plate 94 may be mounted on the bolts 86 or may be rigidly held in position by any other suitable means.

It will be seen that a support means is thus provided for the leads 20 which supports them substantially throughout their length against the rotational forces which occur during operation. The support member 82, however, is designed to have elastic properties such that radial deflection of the leads 20 is permitted at the outer end, so that the leads can move radially sufficiently to follow the radial movement of the connectors 40 which occurs when the wheel rim 28 expands during operation. In this way, the severe bending and overstressing of the leads which occurred with prior supporting means is avoided while adequate support is provided for the leads. The member 28 is preferably an aluminum sleeve but it may be made of any non-magnetic metal, or any other suitable material having the necessary elastic properties.

What is claimed is:

1. In a brushless excitation system including an alternating current exciter and a rotating rectifier assembly having a rectifier wheel supported for rotation with the exciter, said wheel having a radial web portion and a rim portion, rectifier means mounted on the rim portion of the wheel, a plurality of leads extending radially from the exciter and passing through openings in the web portion of the wheel for connection to said rectifier means, and means for supporting said leads comprising an elastic tubular member attached to the web portion of the wheel in position to encircle the leads, said tubular member extending axially over the leads and engaging the leads to support them in the radial direction.

2. The combination defined in claim 1 in which said tubular member has a plurality of longitudinal slots in its inner surface, said leads being disposed in said slots.

3. The combination defined in claim 2 in which the tubular member includes a plurality of fingers in alignment with said slots, the fingers extending axially through the openings in the web portion of the wheel and engaging the leads in said openings.

4. The combination defined in claim 1 in which the tubular member is made of a non-magnetic metal of sufficient elasticity to permit radial deflection of the portions of the leads remote from the wheel under the influence of centrifugal force.

5. In a brushless excitation system including an alternating current exciter having a rotor member including a shaft and carrying an armature winding, a rectifier wheel mounted on the shaft, said wheel having a radial web portion and an axially extending rim portion, rectifier means mounted on said rim portion, a plurality of leads extending from said armature winding, at least portions of said leads extending longitudinally substantially parallel to the shaft and passing through openings in the web portion of the wheel for connection to said rectifier means, means for supporting the leads comprising an elastic tubular member disposed coaxially with the shaft, and means for attaching said tubular member to the web portion of the wheel in encircling relation to said openings, the tubular member extending over at least a substantial part of said longitudinal portions of the leads, and the leads engaging the inner surface of the tubular member to be supported thereby in the radial direction.

6. The combination defined in claim 5 in which said tubular member has a plurality of longitudinal slots in its inner surface, the leads being disposed in the slots.

7. The combination defined in claim 5 in which said tubular member has a plurality of longitudinal fingers extending through said openings in the web portion of the wheel, said fingers engaging the leads in the openings to support the leads.

8. The combination defined in claim 7 and including means on the wheel for rigidly supporting the extremities of said fingers outside the openings.

9. The combination defined in claim 7 in which said tubular member has longitudinal slots in its inner surface in alignment with said fingers, the leads being disposed in said slots.

* * * * *